H. R. HUGHES.
REAMING DRILL.
APPLICATION FILED FEB. 24, 1914.

1,174,575.

Patented Mar. 7, 1916.
2 SHEETS—SHEET 1.

Witnesses:
Geo. R. Ladson.
C. M. Badger

Inventor,
Howard R. Hughes.
By Bakewell & Church Attys.

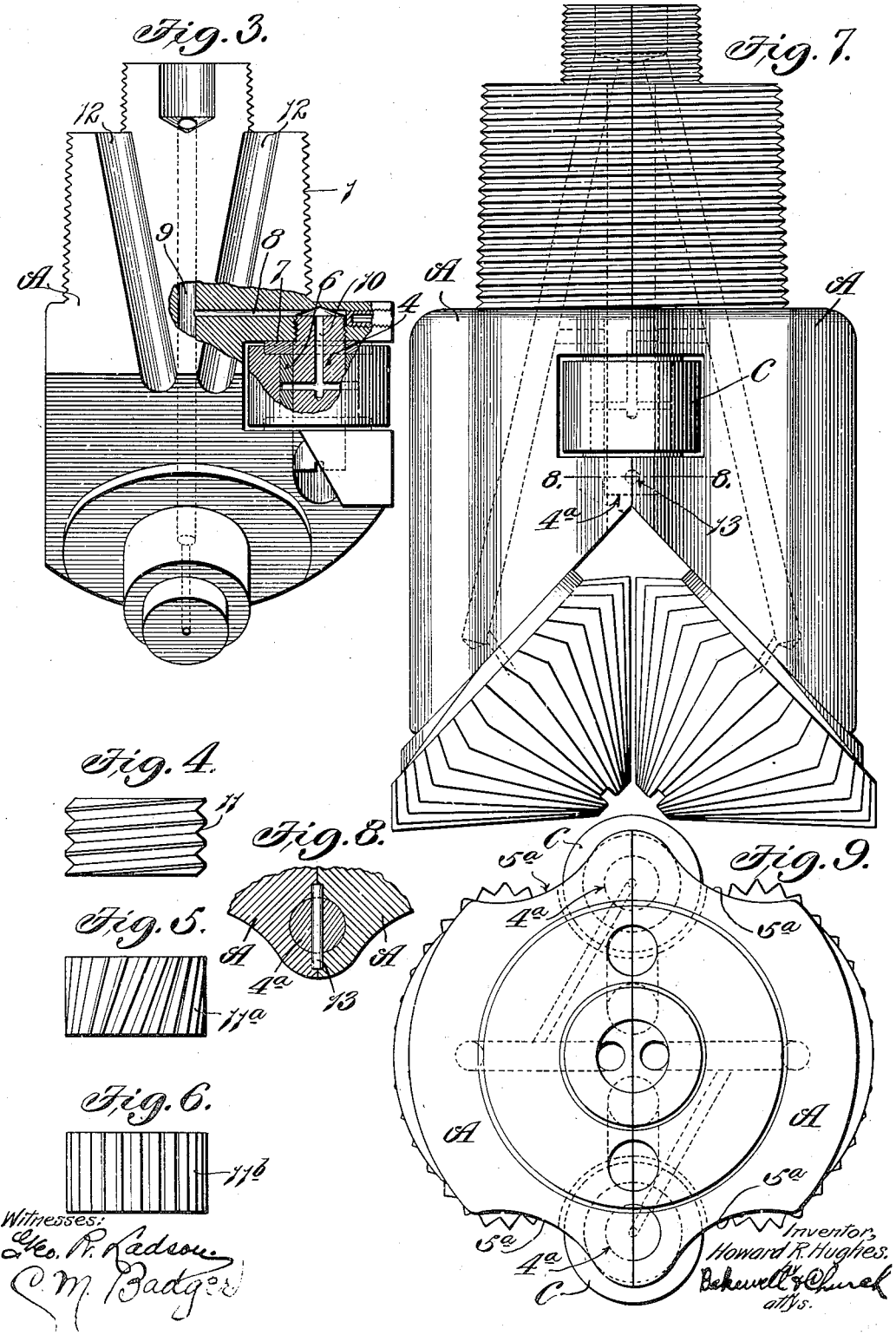

UNITED STATES PATENT OFFICE.

HOWARD R. HUGHES, OF HOUSTON, TEXAS, ASSIGNOR TO SHARP-HUGHES TOOL COMPANY, OF HOUSTON, TEXAS, A CORPORATION OF TEXAS.

REAMING-DRILL.

1,174,575.  Specification of Letters Patent.  Patented Mar. 7, 1916.

Application filed February 24, 1914. Serial No. 820,673.

*To all whom it may concern:*

Be it known that I, HOWARD R. HUGHES, a citizen of the United States, residing at Houston, Texas, have invented a certain new and useful Improvement in Reaming-Drills, of which the following is a full, clear, and exact description, such as will enable others skilled in the art to which it appertains to make and use the same.

This invention relates to rotary boring drills of the type that are provided with rotatable cutters.

The portions of the cutters on rotary drills which are subjected to the greatest wear are the portions of the cutters which act on the outer edge of the bottom of the hole adjacent the side wall of the hole. When these portions of the cutters wear away the drill loses its clearance; or, in other words, fails to make a hole of the required diameter. It is then necessary to ream out the hole or increase the diameter of same so as to bring the hole back to gage.

The main object of my invention is to provide a rotary cutter boring drill which comprises means separate and distinct from the main cutters of the drill for maintaining the clearance of the drill head so as to prevent the diameter of the hole from becoming gradually less or diminishing when the main cutters wear away, said means being permanently combined with the drill head so that it forms as essential a part of the drill as the cutters thereof.

Another object is to provide a rotary boring drill that comprises a head which is adapted to be connected to a drill stem, substantially frusto-conical-shaped cutters rotatably mounted on said head, and cutting rollers mounted in the head at a point above said frusto-conical-shaped cutters and arranged in such a manner that they act on the side wall of the hole and thus maintain the gage of the hole as well as tend to prevent the head from wabbling in the hole. And still another object is to provide a boring drill of the construction just described which is so designed that sufficient clearance is provided for the water that is pumped into the hole to flush out the disintegrated material.

Other objects and desirable features of my invention will be hereinafter pointed out.

Figure 1:
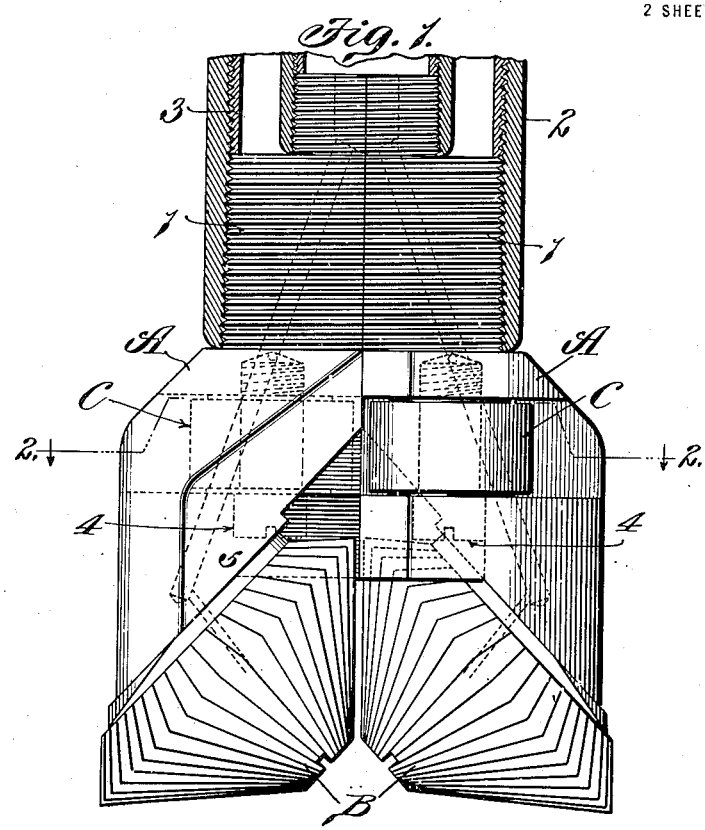
Figure 2:
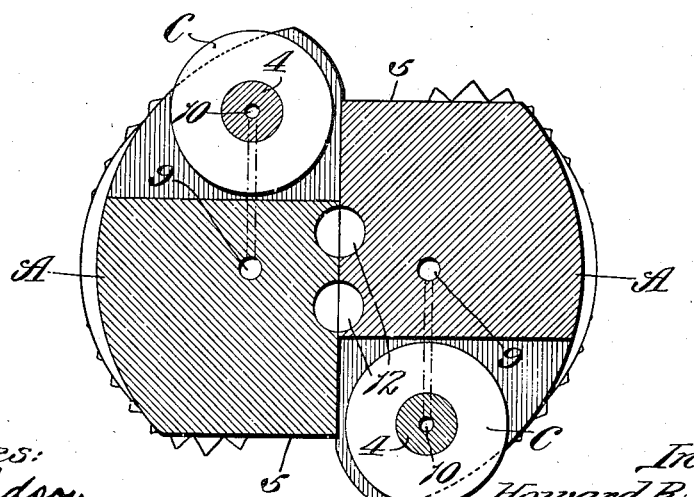

Figure 1 of the drawings is a side elevational view of a rotary cutter drill constructed in accordance with my invention; Fig. 2 is a horizontal sectional view taken on the line 2—2 of Fig. 1; Fig. 3 is a side elevational view of one-half of the head of the drill, partly broken away to more clearly illustrate the mounting of one of the reaming rollers on the head; Figs. 4, 5 and 6 are detail views illustrating various types of cutting surfaces that the reaming rollers can be provided with; Fig. 7 is a side elevational view illustrating a modification of my invention; Fig. 8 is a detail horizontal sectional view taken on the line 8—8 of Fig. 7; and Fig. 9 is a top plan view of the drill shown in Fig. 7.

Briefly described, my improved drill consists of a head provided with rotatable cutters that constitute the main cutting means of the drill and one or more reaming rollers permanently combined with the head and arranged above the main cutters for acting on the side of the hole so as to maintain sufficient clearance for the drill even after the main cutters have become worn to such an extent that they fail to form a hole of the required diameter. I have herein illustrated my invention embodied in a standard type of drill that is now in general use and which comprises a two-part head, each part of which has mounted thereon an approximately frusto-conical-shaped cutter but I do not wish it to be understood that my invention is limited to a rotary boring drill of the particular type mentioned as my broad idea consists in a rotary cutter drill which comprises as a permanent or integral part thereof a means separate and distinct from the main cutters for maintaining the gage of the hole.

Referring to Figs. 1, 2 and 3 of the drawings which illustrate one form of my invention, A designates the two sections or parts of the head of the drill, said sections being provided with coöperating semi-circular-shaped threaded portions 1 that are adapted to be engaged by the coupling sleeve 2 which secures the drill to the drill stem or tubular-shaped operating member 3 through which water is introduced into the hole so as to flush out the disintegrated material. A substantially frusto-conical-shaped cutter B is rotatably mounted on each section A of the head, the axis of rotation of each of said cutters being inclined downwardly and inwardly toward the longitudinal center or axis of the head. Reaming rollers C are mounted in the head at points above the cutters B so as to act on the side wall of the hole and thus maintain the gage of the hole after the cutters B have become worn to such a degree that they fail to make a hole of the required diameter or a hole large enough to provide sufficient clearance for the drill. The reaming rollers C revolve about vertical axes, and they are set in the head in such a manner that they project slightly beyond the side of the head, as shown in Fig. 2. In the embodiment of my invention shown in Figs. 1 to 3, each section A of the drill head is provided with a reaming roller C that forms a permanent or integral part of said section. The sections A are provided with horizontally-disposed grooves or pockets for receiving the reaming rollers C, and said rollers are rotatably mounted on vertically-disposed spindles or shafts 4 which can be connected to the head in any suitable way, the spindles 4 of the drill herein shown being screwed into the top walls of the pockets that receive the reaming rollers, as shown in Figs. 1 and 3, the bottom walls of said pockets being provided with openings in which the lower end portions of said spindles are seated and up through which the spindles are screwed into the top walls of said pockets. One side of each of the sections A of the head is cut away or provided with a flat face 5, as shown more clearly in Fig. 2, so as to provide passageways for the flushing water, and the reaming rollers are arranged at opposite sides of the head, as shown in Fig. 2, so that a passageway will be provided at each side of the head up through which the disintegrated material and flushing water can escape. The spindles 4 are preferably provided with bushings 6 on which the rollers turn, and washers 7 are set in recesses formed in the top and bottom faces of the reaming rollers so as to provide efficient bearing surfaces for the rollers, and the head is provided with branch lubricating ducts 8 that lead from the main lubricating ducts 9 in the head to lubricating ducts 10 formed in the spindles 4 and in the bushings 6, as shown in Fig. 3, so as to keep the bearing surfaces for the reaming rollers thoroughly lubricated.

The reaming rollers can be provided with any suitable type of cutting surface, either a spiral groove 11, as shown in Fig. 4, inclined chisel-teeth 11ª, as shown in Fig. 5, or straight vertically-disposed chisel-teeth 11ᵇ, as shown in Fig. 6.

When the drill is in operation, the reaming rollers C act on the side wall of the hole and shear off any material which the main cutters B have failed to remove from the side wall of the hole, thus keeping the gage of the hole uniform and maintaining sufficient clearance for the drill, even after the main cutters B have become worn to such a degree that they fail to form a hole of the required diameter. Furthermore, said reaming rollers tend to prevent the head from wabbling in the hole as they bear against the side wall of the hole at points intermediate the points where the main cutters B engage the side wall of the hole. The usual water-courses 12 are formed in the head for the flushing water that is pumped down into the hole so as to displace the disintegrated material, and the cut-away portions 5 at the sides of the hole provide sufficient space between the head and the side wall of the hole to permit the disintegrated material and the flushing water to travel upwardly and past the head, thus preventing the disintegrated material from packing in the hole.

While I prefer to construct the drill in the manner previously described, I do not wish it to be understood that my invention is limited to a drill in which the reaming rollers are located in the head in the position illustrated in Fig. 2 and mounted in the manner previously described, for, if desired, the reaming rollers could be located at the dividing line between the two sections A of the head, as shown in Figs. 7 and 9.

In the drill shown in Figs. 7 to 9, inclusive, each of the reaming rollers C is rotatably mounted on a spindle 4ª that is seated in coöperating semi-circular-shaped grooves formed in the meeting faces of the two sections A of the head, said spindle being provided with a cross-pin 13 that is also seated in coöperating recesses or grooves formed in the meeting faces of the sections of the head so as to prevent the spindle from turning or rotating with relation to the head. Cut-out portions 5ª are formed in the head on each side of the reaming rollers, as shown in Fig. 9, so as to provide sufficient clearance between the head and the side wall of the hole for the disintegrated material that is flushed out of the hole by the wash-water.

While the chief object of my invention is to improve and increase the efficiency of the standard Sharp-Hughes rotary drill bit which is now in general use, still my broad idea is applicable to any type of drill or drill bit which loses its clearance when the cutters of same become worn, and therefore I wish it to be understood that my invention is not limited to a drill provided with substantially frusto-conical-shaped cutters. Furthermore, while the chief function of the rollers C is to ream out the hole, they also have another function, namely, they coöperate with the main cutters to hold the drill head straight and prevent it from wabbling in the hole.

Having thus described my invention, what

I claim as new and desire to secure by Letters Patent is:

1. A rotary boring drill, comprising a longitudinally-divided head composed of two members, each of which forms one-half of the head, a cutting means on said head, a horizontally-disposed roller permanently mounted in each of said members at a point above said cutting means, said rollers being positioned diametrically opposite each other and arranged in pockets that are produced by forming horizontal notches in said members, a vertically-disposed spindle for each of said rollers whose end portions are arranged in openings in the top and bottom walls of the pocket, and water passageways in the outer surfaces of the head that extend longitudinally of same adjacent said rollers.

2. A rotary boring drill comprising a longitudinally divided head composed of two members, each of which forms one half of the head, a cutting means on said head, a horizontally-disposed roller permanently mounted in each of said members at a point above said cutting means, said rollers being positioned diametrically opposite each other and arranged in pockets that are produced by forming horizontal notches in said members, a vertically-disposed spindle for each of said rollers that projects upwardly through a hole in the bottom of the roller pocket and is screwed into the top wall of said pocket, and water passageways in the outer surface of the head that extend longitudinally of same adjacent said rollers.

In testimony whereof I hereunto affix my signature in the presence of two witnesses, this 16" day of February 1914.

HOWARD R. HUGHES.

Witnesses:
 L. A. GODBOLD,
 C. E. REED.